Figure 1:
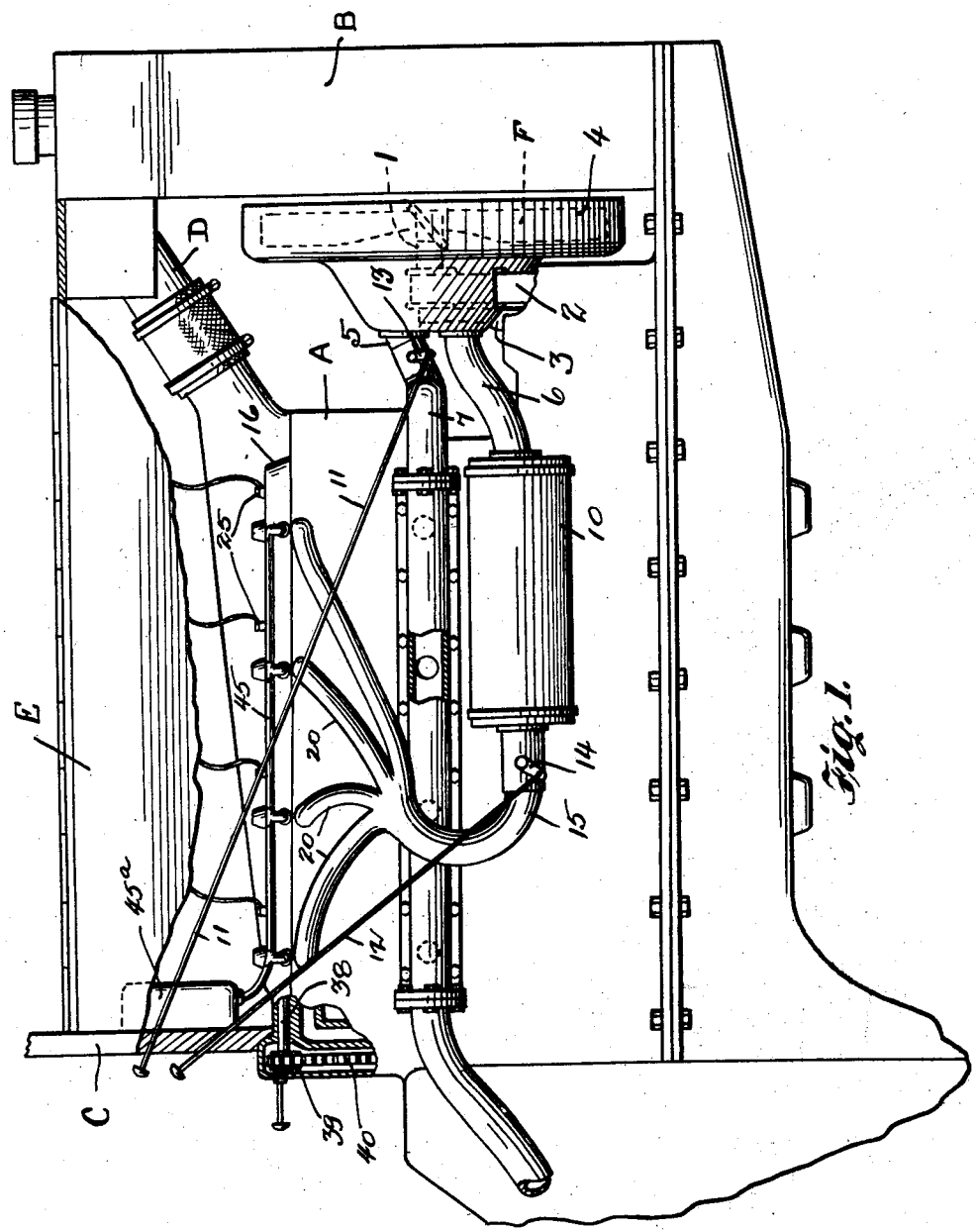

May 17, 1927.

E. H. MAUPIN 1,628,894

INTERNAL COMBUSTION ENGINE

Filed April 1, 1925

3 Sheets-Sheet 1

E. H. Maupin,
Inventor,

By *[signature]*
Attorney.

May 17, 1927.

E. H. MAUPIN 1,628,894

INTERNAL COMBUSTION ENGINE

Filed April 1, 1925    3 Sheets-Sheet 2

E. H. Maupin,
Inventor,

By *[signature]*
Attorney

May 17, 1927.

E. H. MAUPIN 1,628,894

INTERNAL COMBUSTION ENGINE

Filed April 1, 1925　　3 Sheets-Sheet 3

E. H. Maupin,
Inventor.

By *[signature]*
Attorney.

Patented May 17, 1927.

1,628,894

UNITED STATES PATENT OFFICE.

EDWARD H. MAUPIN, OF DALLAS, TEXAS, ASSIGNOR TO MAUPIN AUTOMOTIVE CORPORATION, A CORPORATION OF TEXAS.

INTERNAL-COMBUSTION ENGINE.

Application filed April 1, 1925. Serial No. 19,868.

My present invention relates to internal combustion engines, and in its broad aspect has reference, among other things, to improvements in means and apparatus for creating, regulating and delivering the combustible charge to an internal combustion engine, and then disposing of the products of combustion in an improved manner; and with reference hereto attention is directed to my copending applications for patent serially numbered 16,729 and 16,730.

More particularly it is my purpose to provide means whereby air is delivered under constant, but regulatable, pressure both to an improved mixing chamber and to an improved exhaust manifold device to the end that an effective combustible or explosive charge is formed without the use of the conventional carburetor and the cylinders completely and quickly scavenged of the products of combustion. In accomplishing this and other results I have provided a unique mixing chamber arranged above the several cylinders and communicating therewith through single ports, and I have associated with said mixing chamber improved valve units for controlling the delivery of fuel and air to the cylinders—the fuel and air both being under pressure, and other valve devices for both controlling the delivery of the combustible or explosive charge to the cylinders, and feeding thereto a supply of pure air under pressure subsequent to the ignition of the charge whereby to effectively and quickly scavenge the cylinders in cooperation with a constant air draft developed in the manifold. Furthermore, I have provided means whereby the combustible or explosive charge is effectively mixed and forced (instead of being drawn by suction) into the respective cylinders of the engine, and then subsequently and through the same port leading from each cylinder to the mixing chamber a quantity of pure air delivered to the cylinders to complete the scavenging of spent gases therefrom and manifestly since the air draft referred to emanates from the mixing chamber to which it is delivered under pressure, said mixing chamber will also be thoroughly scavenged.

Other and equally important objects of my invention may be briefly defined as follows; first, I provide improved manually controlled valve apparatus for regulating the richness of the explosive charge, and in conjunction therewith automatic means for regulating the delivery of fuel to the mixing chamber, and the delivery of charges to the respective cylinders; second, I adapt a single valve unit for both regulating the delivery of the combustable charge and subsequently delivering a draft of air to each of the cylinders; third, I provide unique means in connection with the cylinders of my engine for releasing spent gases while the live gases are functioning and before complete exhaust takes place; fourth, I utilize an improved manifold of the type defined in my co-pending application Serial Number 16,730 whereby the spent gases or products of combustion are drawn by suction from the respective cylinders instead of being forced therefrom by pressure as has heretofore been the case; fifth, I provide unique means whereby the gases are drawn from the cylinders from several ports, while at the same time fresh air is supplied to the respective cylinders to completely and quickly scavenge the same; sixth, I provide unique and positive valve control mechanism for my devices, and; seventh, I attain by much simpler apparatus than has heretofore been used a positive, constant and effective timing of fuel delivery to the mixing chamber.

The structural elements employed to accomplish the above and other results and objects will be hereinafter more fully described in detail and specifically pointed out in the claims appended hereunto and forming a part of this specification, but the scope of the invention may only be determined by the limits defined in the claims.

In the accompanying drawings, wherein is illustrated the preferred embodiment of my invention:—

Figure 2:
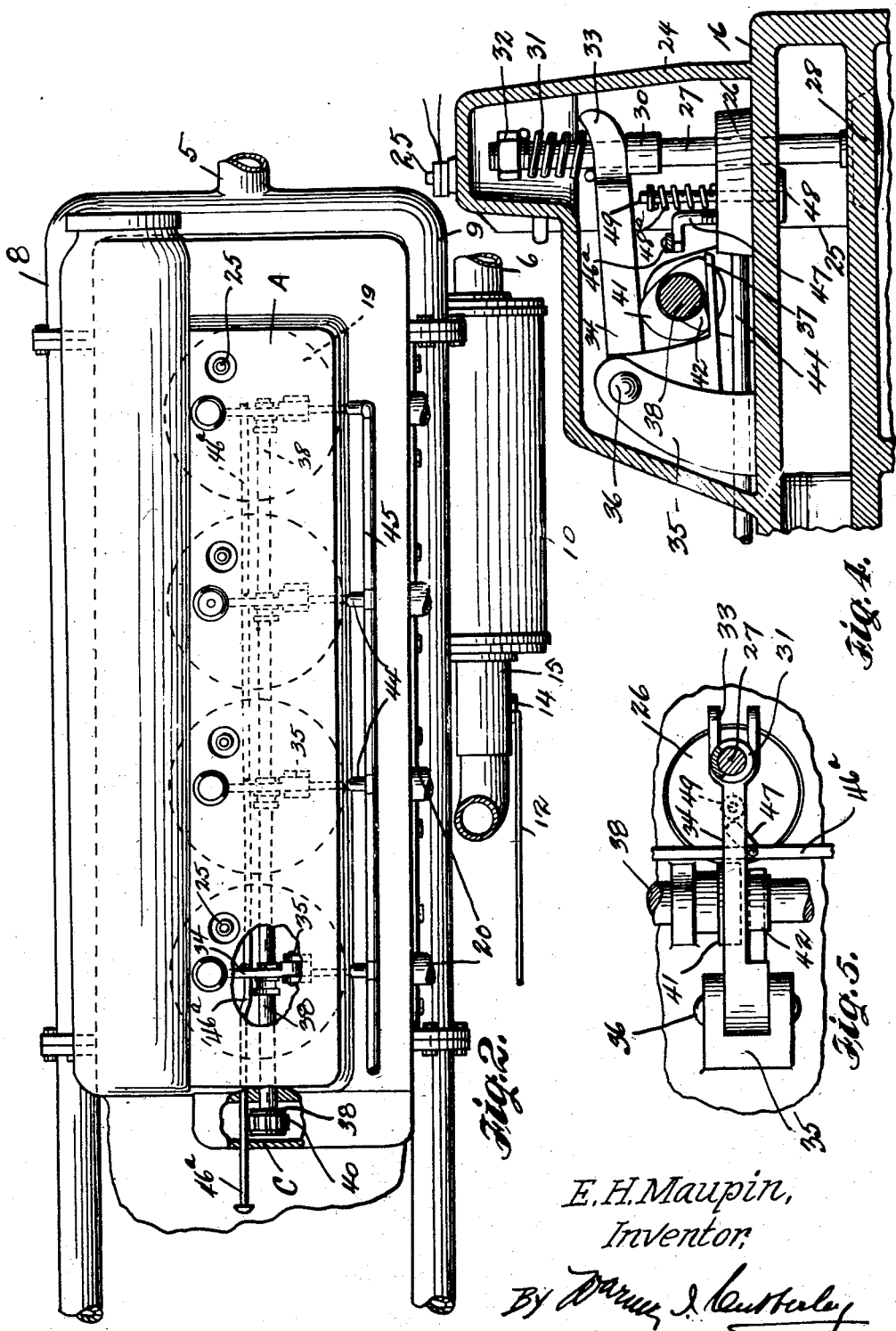
Figure 3:
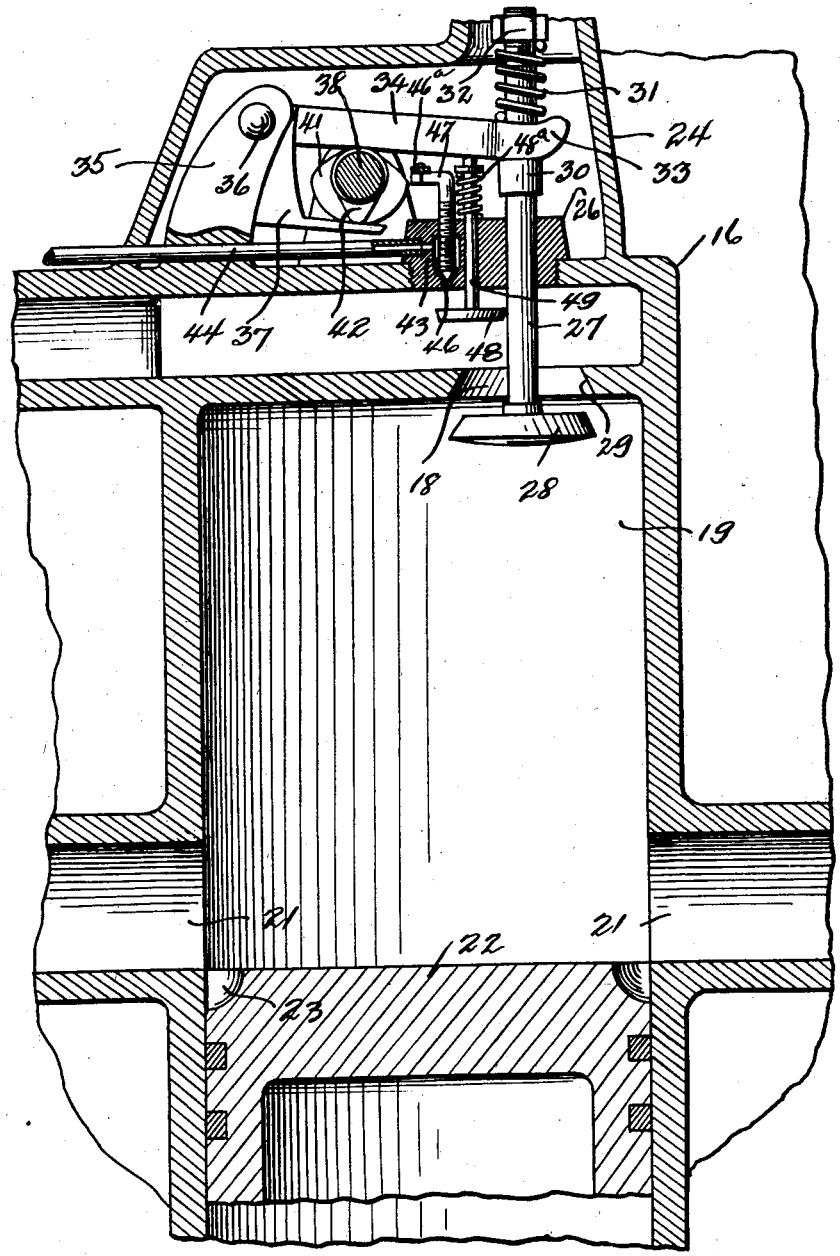
Figure 6:
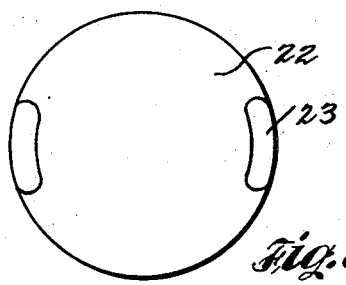

Figure 1 is a side elevation of a power plant assembly showing the arrangement and formation of my apparatus, Figure 2 is a top plan view of a power plant assembly showing my apparatus, Figure 3 is a sectional side view of my improved piston, cylinder, mixing chamber, and valve control assembly, Figure 4 is a detail view of one unit of my valve control assembly, Figure 5 is a top plan view of one unit of my valve control assembly, and Figure 6 is a view of one of my piston heads showing the recesses therein.

In the drawings wherein like characters of reference designate like or similar parts throughout the several views:—

A designates the cylinder block of an internal combustion engine of the type adapted for use with motor vehicles, B the radiator, C the dash board of a motor vehicle, D a portion of the system of circulation for cooling the engine, E the hood, and F the fan.

The fan F is mounted on a shaft (1) over which the fan belt (2) is trained. The shaft (2) is journalled in a support (3) and the entire fan assembly, including the shaft and upper portions of the fan belt and support, is carried in a housing (4) provided with an open front facing the radiator B. Leading from the housing (4) are pipes (5) and (6). The pipe (5) communicates with a double manifold (7), the respective sections (8) and (9) of which extend along each side of the cylinder block A. The pipe (6) communicates with a pressure tank (10) arranged adjacent the cylinder block. Since the manifold and pressure tank communicate with the housing (4) a constant draft of air is supplied to each, and such drafts are controllable manually from the dash C by rods (11) and (12) engaging respectively the lever arms (13) and (14) of suitable gate valves (not shown), one in the pipe (5) and the other in the pipe (15) leading from the pressure tank (10). The internal arrangement and method of operation of my manifold (7) is similar to that described in my co-pending application Serial Number 16,730.

Formed in the top of the cylinder block A is a mixing chamber assembly (16) which communicates through ports (18) with each cylinder (19). The pipe (15) from the pressure tank (10) is of the plural outlet type and each branch (20) communicates with the mixing chamber (16) to supply a draft of air under pressure thereto. The manifold sections (8) and (9) each communicate with the cylinders on opposite sides thereof through ports (21), and the pistons (22) are each recessed as at (23)—see Figure 6—to permit escape of the spent gases adjacent the walls of each of the cylinders and piston heads on the downward or power stroke of the pistons and before the ports (21) are uncovered. This releases or exhausts the spent gases in the portions of the cylinders referred to while the live gases are still functioning (or expanding) to generate power.

Above each cylinder, and formed upon the chamber (16) is a valve unit assembly housing 24, through which the spark plugs (25) extend to the respective cylinders. Carried in a screw threaded openings in the top wall of the mixing chamber (16) are plugs (26) through which shanks (27) of valves (28) extend. Each of the valves (28) seats as at (29) to close one of the ports (18); and the shanks thereof are provided each with a stop or abutment collar (30) above which is arranged a spring (31) rendered adjustable in tension by a nut (32). Each valve shank (27) is engaged by the forked or bifurcated terminal (33) of an arm (34); the point of engagement being between the collar (30) and the spring (31). The arm (34) is a part of a valve control assembly for each cylinder comprising a support (35) on which the arm is pivoted as at (36) and a finger (37) formed integral with the arm, spaced therefrom, shorter than the arm, and parallel thereto. A common cam shaft (38) for actuating the respective valve units is provided with a sprocket (39) over which is trained a silent chain (40) from a power element of the engine (not shown). Mounted on the cam shaft are a plurality of double cam elements, the respective cams of which are designated (41) and (42), one cam element for each valve unit, and the respective cams (41) are adapted to engage and actuate the respective arms (34) to positively seat the valves (28) while the respective cams (42) are adapted to engage the respective fingers (37) to positively move the arms (34) downwardly against the collars (30) to open or unseat the valves (28). The springs (31) serve to normally retain the valves (28) on their seats and are relatively light thereby differing from the valve springs now in use. The foregoing valve assembly is similar to that described in my co-pending application Serial Number 16,729.

Each plug (26) is formed with a chamber (43) with which communicates a pipe (44) from the common fuel supply pipe (45). Fuel is delivered to the chamber (43) under pressure from the tank (45$^a$), and leading from each chamber to the mixing chamber (16) is a port (46). A needle valve (47) controls each port (46), and all needle valves are connected with a common control rod (46$^a$) leading to the dash C so that the amount of fuel for each cylinder can be readily regulated to control the operation of the engine. Also mounted in each plug (26) is a valve (48) held normally seated by a spring (48$^a$). The valves (48) control the delivery of fuel from ports (46), and are adapted to be opened or unseated by engagement of the arms (34) with their respective shanks (49) after the manner of poppet valves.

In practice, the cams (41) and (42) operate to move the respective arms (34) and fingers (37) to actuate in a positive manner the valves (28). The downward movement of the arms (34) first unseats valves (28)—the valves (48) being held seated by springs (48$^a$)—while the piston is in its exhausting cycle of operation with the ports (21) open, and a pure draft of air is therefore allowed to pass through the mixing chamber (16) from the pressure tank (10) and thence to the cylinders to completely scavenge the same. Just prior to the beginning of the compression strokes of the pistons the arms (34) have continued to move downwardly until the shanks of valves (48) are engaged and the valves unseated to release fuel, whereupon the air entering the mixing chamber through port (29) is enriched to form the explosive charge whereupon the valves are closed by further movement of the cams, and the charge exploded at the termination of the compression stroke. Just prior to the uncovering of the exhaust ports by the pistons, the recesses (23) therein permit escape of those spent gases adjacent the cylinder walls and piston head while at the same time the remaining live gases continue to generate power to complete the stroke. While I have here described an engine equipped with my apparatus as having a plurality of cylinders, it will be understood that my apparatus finds equally effective application with one cylinder motors. The type of internal combustion engine herein described with respect to its stages of operation is that of the two cycle type.

While the operation of my invention is believed to be apparent from the foregoing, it is pointed out that a constant draft of air is delivered by the fan F to the reservoir (10) and manifold sections (8) and (9). The function of this draft in the manifold is to create a suction action on the ports (21) to completely and expeditiously scavenge the cylinders, expedite exhausting from the manifold, prevent the formation of carbon monoxide and other deleterious gases, and dispense with the use of mufflers. The body of air contained under pressure in the pressure tank (10) is delivered to the compartments of the mixing chambers for re-delivery to the cylinders and for forming the explosive charges. The richness of the mixture can be regulated by adjustment of valves (47) or of the gate valve in the pressure line from the pressure tank. In practice both are usually adjusted to obtain proper fueling. The valves (47), (48) and (28) are relatively independent structurally, but the valves (48) and (28) both depend for actuation on the arm (34). Among other things, the purpose of my present valve assembly is to render both the opening and closing of the valves positive in every way, and to dispense with the heavy master springs utilized in present day motors. Special attention is invited to the simplicity of my apparatus both in construction and operation.

While in the foregoing, there has been illustrated and described such combination and arrangement of elements as constitute the preferred embodiment of my invention, it is nevertheless desired to emphasize the fact that interpretation of the invention should only be conclusive when made in the light of the subjoined claims.

Having described my invention and its objects with such attention to detail as will thoroughly acquaint one skilled in the art with its construction and advantages, I claim:—

1. The combination in an internal combustion engine, a mixing chamber communicating with the cylinders, plural exhaust manifolds, means for constantly supplying a draft of air through the manifolds, means for supplying air under pressure to the mixing chamber, plural valve devices, one for each cylinder, and adapted to permit circulation of air from said last mentioned air supply means through the mixing chamber to the cylinders in one operation, valve devices for admitting fuel to the mixing chamber, and said first named valve devices adapted to deliver the charge from the mixing chamber to the cylinders in another operation.

2. The combination in an internal combustion engine, a mixing chamber, means for receiving the exhaust from the cylinders, means for constantly developing a draft of air through said exhaust means, means for supplying air under pressure to the mixing chamber, means for controlling the delivery of fuel to the mixing chamber, and means for alternately developing circulation of air from the last mentioned supply means through the mixing chamber to the cylinders, and releasing the charge in the mixing chamber to the cylinders.

3. The combination in an internal combustion engine, a mixing chamber communicating with the cylinders, exhaust manifolds, independent air pressure lines serving respectively the mixing chamber and the manifolds, means for controlling the delivery of fuel to the mixing chamber, and means for controlling and releasing the charge in the chamber to the cylinders and controlling the operation of the pressure line with respect to the mixing chamber.

4. The combination in an internal combustion engine, a mixing chamber communicating with the cylinders, exhaust manifolds, means for developing circulation of air, a housing about said means, a pressure tank communicating with the housing and with the mixing chamber for delivering thereto air under pressure, a pressure line connecting the manifolds with the housing, means for controlling the admission of fuel to the mixing chamber, and means for releasing the charges from the mixing chamber to the cylinders and developing circulation of air from the pressure tank, through to the mixing chamber, the cylinders.

5. The combination in an internal combustion engine, a mixing chamber, exhaust manifolds, means for regulating the admission of fuel to the mixing chamber, means for positively forcing the charge from the mixing chamber to the cylinder, means for positively sucking the spent gases from the cylinder to the manifolds, and means for developing a circulation of air through the mixing chamber, to the cylinders.

6. The combination in an internal combustion engine, a mixing chamber, exhaust manifolds, means for regulating the admission of fuel to the mixing chamber, air pressure means for positively forcing the charge from the mixing chamber to the cylinder, and air pressure means in connection with the manifolds for sucking the spent fumes from the cylinder to the manifolds.

7. The combination in an internal combustion engine, a mixing chamber communicating with the cylinders, exhaust manifolds communicating with each cylinder through several ports, means for developing air pressure in the mixing chamber, means for developing a constant draft of air through the manifolds, and valve means for permitting a circulation of air from the mixing chamber, through the cylinders to the manifolds.

8. In an internal combustion engine, a mixing chamber, a valve unit for controlling the operation of the mixing chamber, said unit comprising a manually controllable needle valve for regulating the amount of fuel delivered from the fuel line to the mixing chamber, a spring seated valve for releasing such fuel to the mixing chamber, a valve for delivering the charge from the mixing chamber to the cylinder, an arm engaging said last valve, double cams one for moving said arm to seat said last mentioned valve and the other to unseat the valve, and said arm adapted to engage the fuel release valve to unseat the same at a predetermined point in its path of movement.

In testimony whereof, I affix my signature hereunto.

E. H. MAUPIN